(12) United States Patent
Nystad

(10) Patent No.: US 11,288,850 B1
(45) Date of Patent: Mar. 29, 2022

(54) IDENTIFYING PRIMITIVES AND VERTICES TO BE RENDERED WHEN RENDERING AN OUTPUT IN A GRAPHICS PROCESSING SYSTEM

(71) Applicant: Arm Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/189,815

(22) Filed: Mar. 2, 2021

(51) Int. Cl.
*G06T 11/20* (2006.01)
*G06T 1/20* (2006.01)
*G06T 1/60* (2006.01)

(52) U.S. Cl.
CPC ............. *G06T 11/203* (2013.01); *G06T 1/20* (2013.01); *G06T 1/60* (2013.01); *G06T 2210/52* (2013.01)

(58) Field of Classification Search
CPC . G06T 1/20; G06T 1/60; G06T 11/203; G06T 15/005; G06T 2210/52
USPC ........................................................ 345/441
See application file for complete search history.

(56) References Cited

U.S. PATENT DOCUMENTS

| | | | |
|---|---|---|---|
| 10,235,793 | B2 | 3/2019 | Arntzen |
| 2015/0269773 | A1* | 9/2015 | Pearson ............... G06T 17/005 345/420 |

* cited by examiner

*Primary Examiner* — Jacinta M Crawford
(74) *Attorney, Agent, or Firm* — Vierra Magen Marcus LLP

(57) ABSTRACT

There is disclosed a method of processing an input set of indices that may contain one or more primitive restarts to determine which indices correspond to complete primitives. A modified version of the set of indices can then be written out that contains complete primitives. In particular this is done by determining, for each index in the set of indices, the index position of the start of a sequence of indices for a sequence of primitives that the index is part of, and then determined from this whether or not the index position corresponds to the start of a complete primitive.

20 Claims, 4 Drawing Sheets

IDENTIFYING PRIMITIVES AND VERTICES TO BE RENDERED WHEN RENDERING AN OUTPUT IN A GRAPHICS PROCESSING SYSTEM

BACKGROUND

The technology described herein relates to graphics processing systems and in particular to methods of and apparatus for identifying primitives and vertices to be rendered when rendering an output in a graphics processing system.

Computer graphics systems typically produce their output, such as frames for display, by processing so-called primitives, which are usually simple polygons such as triangles, or lines or points. Each primitive is normally defined by a set of vertices (e.g. three vertices in the case of a triangular primitive).

Typically the set of vertices to be used for a given graphics processing output (e.g. frame for display, draw call, etc.) will be stored as a set of vertex data defining the vertices (e.g. the relevant attributes for each of the vertices). A set of vertex data defining the vertices to be used for generating a given graphics processing output is typically referred to as a vertex buffer or vertex buffer stream.

While it would be possible simply to store the vertices to be used for each primitive to be generated in turn in the vertex buffer (such that, in effect, the list of vertices in the vertex buffer will correspondingly define the primitives to be processed), it is also known to define the primitives separately, in terms of a set of indices that reference the vertices in the set of vertex data. This can then avoid, e.g., the need to duplicate vertices in the set of vertex data (in the vertex buffer), as a single vertex entry in the vertex buffer can be referred to multiple times by reusing the relevant index in the set of indices.

In this case therefore the set of primitives to be processed for a given graphics processing output will be defined by a set of indices (an index buffer stream) that indicates the corresponding vertices in a set of vertex data (in a vertex buffer stream) that are to be used for the primitives in question. Again, the set of indices that refer to the vertices and define the primitives to be processed is typically referred to as an index buffer or an index buffer stream.

For example, for a set of vertices (a vertex buffer stream) V:

$V=(A,B,C,D)$, a set of indices (an index buffer stream) I:

$I=(0,1,2,3,2,1)$ can be used to create the following set (in this case a pair) of triangular primitives P from the set of vertices (vertex buffer stream) V:

$P=((A,B,C)(D,C,B))$.

In this example, the set of indices specifies each vertex to be used explicitly. However, it is also known to use more compact index representations in the set of indices for defining primitives to be processed. For example, a set of indices may define a triangle "strip", comprising a number of triangular primitives, in which the last two indices of the previous primitive are used for the next primitive. This then means that only one extra index is required to create a new (adjacent) triangular primitive. In these arrangements, the winding order of the primitives is typically also defined to change for each new primitive (e.g. such that if the current primitive count (or position) in the set of indices is odd, then the order of the first two indices in the primitive are swapped).

For example:
for $V=(A,B,C,D,E,F)$ and $I=(0,1,2,3,4,5)$, then $P=((A,B,C)(C,B,D)(C,D,E)(E,D,F))$.

With this scheme, since two out of every three indices are shared, a factor of three compaction for the set of indices can be achieved.

As another example, a set of indices may define a triangle "fan", comprising a number of triangular primitives that share a central vertex, such that there will be a hub index that is common to all of the all primitives in the fan.

For example:
for $V=(A,B,C,D,E,F)$ and $I=(0,1,2,3,4,5)$, then $P=((A,B,C)(A,C,D)(A,D,E)(A,E,F))$.

With this scheme, only N+2 indices are required to describe a group of N triangular primitives in a fan arrangement, rather than the 3N indices that would be required to describe the same N triangles separately.

Corresponding arrangements are known and used for other primitive arrangement "types", such as line strips, line loops, etc. In the simplest case of point primitives, each index may correspond to a different point primitive.

It is also known to include in a set of indices defining a set of primitives to be processed, one or more "primitive restarts". A primitive restart is a position in the set of indices after which a new sequence of primitives, for example for a new triangle strip, is started. The next index (position) after a primitive restart is the start of a new primitive (irrespective of how the preceding sequence of indices in the set divides into primitives).

A primitive restart may be indicated, e.g., by means of a particular, in an embodiment predefined, index value in the set of indices, that is to be interpreted as indicating that the next index position in the set of indices starts a new primitive.

The primitive restart feature allows a set of indices to be divided (at any desired point) into different sequences of primitives, e.g. where vertices between a pair of consecutive primitives in the set of indices are not shared. This is a particularly useful technique when, e.g., combining multiple independent triangle strips, or fans, together, but is generally defined for other primitive arrangement types as well.

For example, if the value '99' is used to indicate such a primitive restart, for an index array I=(1, 2, 3, 4, 99, 5, 6, 7) provided in the triangle strip mode, then the resulting triangular primitives will be (1, 2, 3) (3, 2, 4) and (5, 6, 7), wherein the first two primitives correspond to a first triangle strip and the third primitive corresponds to a second triangle strip.

However, while the use of primitive restarts in a set of indices can be useful, it can lead to difficulties when using the set of indices to identify and generate primitives to be processed. For example, certain graphics processing operations may require "complete" primitives as their input.

However, as primitive restarts (when used) can occur anywhere in an input set of indices, the use of primitive restarts can make the identification of complete primitives in a set of indices that contains primitive restarts more difficult. For example, it may be necessary to analyse each primitive in the set of indices before a "current" primitive that is being considered, in order to be able to identify the correct set of vertices for the "complete" current primitive.

The Applicants accordingly believe that improved methods for handling sets of indices that may contain primitive restarts in graphics processing systems would be desirable.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
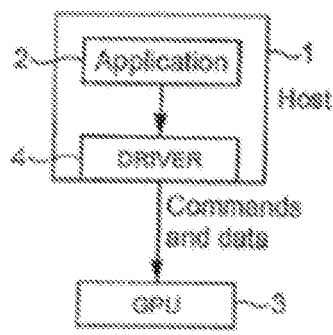
FIG. 1 shows an exemplary computer graphics processing system.

A first embodiment of the technology described herein comprises a method of processing a set of indices in a graphics processing system, the set of indices comprising a sequence of indices indexing a set of vertices to identify vertices to be used to form graphics primitives to be processed;

each index in the set of indices having a respective index position in the set of indices;

the method comprising:

determining, for each index in the set of indices, the index position of the start of a sequence of indices for a sequence of primitives that the index is part of;

determining, for each index in the set of indices, how far away the index position of the index is from the determined start of the sequence of indices for the sequence of primitives that the index is part of, and thereby generating a corresponding set of distance values representing for each index in the set of indices how far away the index position of the index is from the start of the sequence of indices for the sequence of primitives that the index is part of;

determining, using the set of distance values, for each index in the set of indices, whether the index corresponds to the start of a complete primitive in the sequence of indices for the sequence of primitives that the index is part of;

writing out a modified version of the set of indices that comprises some or all of the primitives defined in the set of indices as complete primitives; and using the modified version of the set of indices that contains complete primitives to process the primitives defined by the input set of indices.

A second embodiment of the technology described herein comprises an apparatus for processing a set of indices in a graphics processing system, the set of indices comprising a sequence of indices indexing a set of vertices to identify vertices to be used to form graphics primitives to be processed;

each index in the set of indices having a respective index position in the set of indices;

the apparatus comprising:

a primitive assembly circuit comprising:

a start index position determining circuit configured to determine, for each index in the set of indices, the index position of the start of a sequence of indices for a sequence of primitives that the index is part of;

a distance values determining circuit configured to determine, for each index in the set of indices, how far away the index position of the index is from the determined start of the sequence of indices for the sequence of primitives that the index is part of, and thereby generate a corresponding set of distance values representing for each index in the set of indices how far away the index position of the index is from the start of the sequence of indices for the sequence of primitives that the index is part of; and a primitive determining circuit configured to determine, using the set of distance values, for each index in the set of indices, whether the index corresponds to the start of a complete primitive in the sequence of indices for the sequence of primitives that the index is part of;

the apparatus further comprising:

a write out control circuit configured to write out a modified version of the set of indices that comprises some or all of the primitives defined in the set of indices as complete primitives for use when processing the primitives defined by the input set of indices.

The technology described herein processes a set of indices defining primitives to be rendered where the set of indices may, and in an embodiment does, contain one or more primitive restarts (wherein a primitive restart allows the set of indices to be divided into different sequences of primitives). In particular, the technology described herein processes the set of indices to determine for each index (position) in the set of indices, whether that index (position) corresponds to, or at least could correspond to, a part of a complete primitive (e.g. of a certain primitive arrangement "type" that has been specified for the set of indices). In this way it is possible to identify which (if any) indices (index positions) in the set of indices should generate (or 'spawn') a new primitive, and to flag those indices (index positions) accordingly, e.g. to allow a modified version of the set of indices which modifier version of the set of indices contains (only) complete primitives to be written out for use, e.g. in the next processing stage(s) of the graphics processor.

In particular, this is done by determining, for each index position, how far away the index position is from the position of the start of a sequence of indices for a sequence of primitives that the index position is part of, and then determining as a function of the distance to the start of the sequence of indices for the sequence of primitives whether or not the index position may correspond to the start of a complete primitive (e.g., and in an embodiment for the specified primitive arrangement type). For example, and in an embodiment, it is determined whether (and which of) the indices (index positions) may correspond to the start of a new primitive of a specified primitive arrangement type, and those indices (index positions) are flagged accordingly as being able to generate a new primitive.

As will be discussed further below, this method provides an efficient mechanism for identifying complete primitives for assembly in a set of indices that contains primitive restarts. Moreover, and again as will be discussed further below, the technology described herein facilitates performing this primitive assembly operation in a parallel manner on the set of indices (e.g., and in an embodiment, for plural indices (index positions) in parallel), thereby providing a technique that can be implemented in a (relatively) efficient and scalable manner.

Thus, the technology described herein recognises that it is possible to identify from a set of indices which of the indices (i.e. which index positions) potentially correspond to the start of a complete primitive within a sequence of indices for a sequence of primitives, e.g., of a given, specified primitive arrangement type (which primitive arrangement "type" may, e.g., and in embodiment does, comprise an individual triangular primitive, a triangle strip, a triangle fan, etc.) by considering how far away in the set of indices each of the indices (index positions) are from the start of a sequence of indices for a sequence of primitives that the index position is part of.

For instance, within a set of indices, there may be one or more sequences of indices defining a corresponding one or more sequences of primitives. The start of a sequence of indices for a sequence of primitives to be processed will therefore generally correspond to an index position in the set of indices that is (immediately) before the index position of the first index in the sequence of indices in question that could potentially generate a new primitive.

For example, each new sequence of indices for a respective sequence of primitives may be identified in the set of indices by a primitive restart, and in the technology described herein this is the case. That is, in the technology described herein, as mentioned above, the set of indices may, and in an embodiment does, include one or more primitive restarts, where each primitive restart identifies the start of a new sequence of indices for a sequence of primitives. Thus, each pair of primitive restarts define between them a sequence of indices (having index positions between the index positions of the primitive restarts) that may, and in an embodiment does, represent a respective sequence of one or more primitives to be processed. (It may of course be the case that for a sequence of indices between a given two primitive restarts it is not possible to generate any complete primitives. However, it will typically, and in an embodiment, be the case that the number of primitive restarts in the sequence of indices to be processed is relatively low compared to the number of primitives such that this will rarely be the case, and such that for most, if not all, sequences of indices falling between two primitive restarts it will be possible to generate one or more complete primitives.)

The next index (position) after a primitive restart is the start of a new potential primitive. Thus, determining how far away the index position is in the set of indices from the start of the sequence of indices for the sequence of primitives that the index position is part of may, and in an embodiment does, comprise determining how far away the index position is from the most recent (preceding) primitive restart in the set of indices. Thus, the first index (position) after a primitive restart is one index position away from the start of the sequence of indices for the sequence of primitives that the index (position) is part of, and so on. Where the index (position) being tested itself represents a primitive restart, the distance is therefore zero.

The first index (position) in the set of indices is also capable of generating a new primitive. Correspondingly, for any indices (index positions) occurring before the position of the first primitive restart in the set of indices, the start of the sequence of indices for the sequence of primitives that those indices (index positions) are part of is a (virtual) index position immediately before the index position of the first real index in the set of indices. For example, where the indices in the set of indices have index positions that are numbered starting at '0', this will be the '−1' index position. In that case, for the indices (index positions) occurring before the position of the first primitive restart in the set of indices, the distances from the start of the sequence of indices for the (first) sequence of primitives in the set of indices will be given by the index positions themselves (so the first index in the set of indices, with index position '0' is one index position away from the start of the sequence of indices for the sequence of primitives at index position '−1', and so on).

In order to determine how far away each index position is from the start of the sequence of indices for the sequence of primitives that the index position is part of, the set of indices is in an embodiment therefore first processed (in an embodiment in full) to determine, for each index (position) in the set of indices, whether or not the index (position) corresponds to a primitive restart. For instance, this can be done by evaluating for each index (position) a suitable predicate function (a function that returns either TRUE or FALSE), e.g. by setting the predicate function to "is the index (position) a primitive restart?", or some other similar suitable predicate, as desired. For example, as mentioned above, a primitive restart may be represented in the set of indices by a certain index value (e.g., and in an embodiment a value that is not likely to (or will not) occur naturally, such as '99'), and evaluating the predicate may thus comprise checking the index value that is associated with the index (position) that is being tested. However, various arrangements would be possible in this regard.

Each index (position) in the set of indices is thus in an embodiment evaluated, e.g., and in an embodiment, in turn, in order to determine whether or not the index (position) corresponds to a primitive restart. In this way it is possible to determine the (index) positions of the primitive restarts in the set of indices.

Correspondingly, by determining the positions of the primitive restarts in this way, it is also possible to determine, for any indices (index positions) that do not correspond to a primitive restart, the position of the start of the sequence of indices for the sequence of primitives that the index (position) in question is part of (which may, e.g., be the position of the most recent (preceding) primitive restart in the set of indices, or may be the (virtual) index position before the index position of the first real index in the set of indices).

In an embodiment these determinations are made at the same time, in an embodiment in a single processing operation, e.g., and in an embodiment, by executing a so-called "prefix sum" algorithm over the set of indices (index positions), e.g., and as will be explained further below.

In particular, the prefix sum in an embodiment evaluates, for each index in the set of indices (index positions), an appropriate function that outputs for the index in question the position of the start of the sequence of indices for the sequence of primitives that the index (position) is part of. For instance, as mentioned above, each primitive restart in the set of indices may, and in an embodiment does, define a new sequence of indices for a sequence of primitives. Thus, the function will in an embodiment output the index position of the most recent (preceding) primitive restart in the set of indices. Or, if the index (position) that is being tested occurs before the position of the first primitive restart in the set of indices, the function will in an embodiment output an index position before the index position of the first index in the set of indices (i.e. the '−1' index position if the index positions start at '0', as described above). The output position for an index will therefore correspond to that index's position (the current index position) where the index itself corresponds to a primitive restart.

For instance, and in an embodiment, the prefix sum algorithm applies a suitable function, e.g., and in an embodiment, comprising a function that evaluates, for each index (position) in the set of indices, whether or not the index (position) corresponds to a primitive restart and then: when it is determined that the index (position) that is being evaluated corresponds to the start of the sequence of indices for the sequence of primitives that the index (position) is part of (e.g., or in other words, corresponds to a primitive restart), outputs the current index position; whereas when it is determined that the index (position) that is being evaluated does not correspond to the start of the sequence of indices for the sequence of primitives that the index (position) is part of (i.e. does not correspond to a primitive restart), outputs the index position for the start of the sequence of indices for the sequence of primitives that the index (position) is part of (which may, e.g., and in an embodiment does, correspond to the index position of the most recent (previous) primitive restart in the set of indices, or a virtual (e.g. '−1') index position immediately before the position of the first index in the set of indices if the index position being evaluated occurs before the first primitive restart in the set of indices) (this is an example of a 'conditional-right-select' function, as will be explained further below).

In other words, the present inventors have recognised that such a conditional-right-select function advantageously can be (and in embodiments of the technology described herein therefore is) evaluated for each index (position) in the set of indices by performing a prefix sum on the set of indices with such function as the input function for the prefix sum.

For example, a prefix sum is, in general, an algorithm that takes as input a function F(x, y), an set of data values {x} and an initial value $v_0$ and then computes a new set of output values {y}, wherein:

$$y_1 = F(v_0, x_1); y_2 = F(y_1, x_2); y_3 = F(y_2, x_3), \text{etc.}$$

Accordingly, by setting the input function F(x, y) for the prefix sum to a suitable function that can output, for each index (position) in the set of indices, the position of the start of the sequence of indices for the sequence of primitives that the index (position) is part of, e.g., the function described above, and then evaluating the prefix sum over each of the index positions {x} in the set of indices, it is possible to generate an output sequence {y} indicating, for each index position xi in the set of indices, the position of the start of the sequence of indices for the sequence of primitives that the index position is part of For example, the following function (as expressed in C-like pseudocode) may suitably be used to evaluate the predicate function over the set of indices (index positions), and by setting the predicate function appropriately, to output the position of the start of the sequence of indices for the sequence of primitives that the index position is part of:

```
int F(int y, int x) {
  if(predicate(x)) return x;
  else return y;
}
```

This is the 'conditional-right-select' function. What this function does is evaluate the predicate (e.g. "is the index position a primitive restart?") on the current index having index position x in the set of indices and then returns the value of the index position x when the predicate is true, e.g. when the index position x being tested does correspond to a primitive restart. Otherwise, when the predicate is false, e.g. the index position x being tested does not correspond to a primitive restart, the function returns a value y. Thus, by setting the initial value of $v_0$ to the position of the start of the sequence of indices (i.e. the position before the index position of the first index in the set of indices, e.g. by setting the initial value of $v_0$ to '−1' where the indices have index positions numbered from '0'), and then executing this function over the index sequence using a prefix sum, as described above, the function evaluates for each index position in the set of indices {x} whether or not the index position corresponds to a primitive restart.

When the index (position) does correspond to a primitive restart the function returns the index position itself.

On the other hand, when the index (position) does not correspond to a primitive restart, the function will return the position of the start of the sequence of indices for the sequence of primitives that the index position is part of (which will either be index position for the most recent (preceding) primitive restart in the set of indices, i.e. the primitive restart that defines the start of the sequence of indices for the sequence of primitives that the index position is part of, or the position of a virtual index before the first index in the set of indices if the first primitive restart in the set of indices has not yet been encountered).

Thus, the result of performing such a prefix sum algorithm based on such a 'conditional-right-select' function, e.g. as described above, to the set of indices (index positions) is to output for each index (position) the position of the start of the sequence of indices for the sequence of primitives that the index (position) is part of. Accordingly, a new set of values can be generated, having a one-to-one correspondence with the input set of indices, and representing, for each index (position) in the set of indices, the position of the start of the sequence of indices for the sequence of primitives that the index (position) is part of.

Thus, in embodiments, determining, for each index (position) in the set of indices, the position of the start of the sequence of indices for the sequence of primitives that the index (position) is part of comprises: performing a prefix sum over the set of indices (index positions), wherein the prefix sum evaluates, for each index (position) in the set of indices, a function that determines whether or not the index (position) corresponds to the start of a new sequence of indices for a sequence of primitives, and when it is determined that the index (position) being evaluated corresponds to the start of a new sequence of indices for a sequence of primitives, the function outputs the current index position, whereas when it is determined that the current index (position) does not correspond to the start of a new sequence of indices for a sequence of primitives, the function outputs the position of the start of the sequence of indices for the sequence of primitives that the index (position) is part of The benefit of this approach is that the prefix sum can be evaluated in a parallel manner, e.g., such that the determination of the position of the start of the sequence of indices for the sequence of primitives that the index (position) is part of for each of the indices (index positions) in the set of indices can be performed using relatively fewer processing cycles, e.g., and in an embodiment, in parallel, in a single processing step. Thus, in embodiments, the prefix sum is performed over the index positions for all of the indices in the set of indices in parallel.

Furthermore, the approach described above may be highly scalable. In particular, in this regard, the present inventors have recognised that where the function that is evaluated using the prefix sum is an associative function (that is, it satisfies the relation F(F(a, b), c)=F(a, F(b, c))), for a set of N indices (index positions), the prefix sum can be evaluated in parallel with a latency of only order log (N) evaluations of the function.

Thus, in embodiments, the function that is evaluated using the prefix sum is an associative function. This means that the evaluation of the prefix sum can be scaled for a sequence of N indices (index positions) with an order log (N), e.g. rather than with order N as may be required if processing the indices in (e.g.) a more serial fashion. The present inventors have further recognised that this is the case for the conditional-right-select function described above.

The approach described above can therefore provide a highly efficient and scalable approach that can increase the speed for the primitive assembly stage, thereby reducing a potential bottleneck in the graphics processing pipeline.

It is believed that this approach for determining whether an index position in a sequence of indices corresponds to the start of a sequence of indices for a sequence of primitives, or otherwise determining the position of the start of the sequence of indices for the sequence of primitives that the index at the index position being tested is part of may be novel and advantageous in its own right.

A further embodiment of the technology described herein comprises a method of processing a set of indices in a graphics processing system, the set of indices comprising a sequence of indices indexing a set of vertices to identify vertices to be used to form graphics primitives to be processed;
   each index in the set of indices having a respective index position in the set of indices;
   the method comprising:
   determining, for each index in the set of indices, the index position of the start of a sequence of indices for a sequence of primitives that the index is part of by:
   performing a prefix sum over the set of indices, wherein the prefix sum evaluates a function that determines whether or not the index corresponds to the start of a new sequence of indices for a sequence of primitives, and
   when it is determined that the index being evaluated corresponds to the start of a new sequence of indices for a sequence of primitives, the function outputs the index position of the index,
   whereas when it is determined that the index being evaluated does not correspond to the start of a new sequence of indices for a sequence of primitives, the function outputs the position of the start of the sequence of indices for the sequence of primitives that the index is part of;
   the method further comprising:
   determining, for each index in the set of indices, based on the determined position of the start of a sequence of indices for a sequence of primitives that the index is part of, whether the index corresponds to the start of a complete primitive;
   writing out a modified version of the set of indices that comprises some or all of the primitives defined in the set of indices as complete primitives; and using the modified version of the set of indices that contains complete primitives to process the primitives defined by the input set of indices.

Another embodiment of the technology described herein comprises an apparatus for processing a set of indices in a graphics processing system, the set of indices comprising a sequence of indices indexing a set of vertices to identify vertices to be used to form graphics primitives to be processed;
   each index in the set of indices having a respective index position in the set of indices;
   the apparatus comprising:
   a primitive assembly circuit comprising:
   a start index position determining circuit configured to determine, for each index in the set of indices, the position of the start of a sequence of indices for a sequence of primitives that the index is part of by:
   performing a prefix sum over the set of indices, wherein the prefix sum evaluates a function that determines whether or not the index corresponds to the start of a new sequence of indices for a sequence of primitives, and
   when it is determined that the index being evaluated corresponds to the start of a new sequence of indices for a sequence of primitives, the function outputs the index position of the index,
   whereas when it is determined that the index being evaluated does not correspond to the start of a new sequence of indices for a sequence of primitives, the function outputs the position of the start of the sequence of indices for the sequence of primitives that the index is part of;
   the primitive assembly circuit further comprising:
   a primitive determining circuit configure to determine, for each index in the set of indices, based on the determined position of the start of a sequence of indices for a sequence of primitives that the index is part of, whether the index corresponds to the start of a complete primitive;
   the apparatus further comprising:
   a write out control circuit configured to write out a modified version of the set of indices that comprises some or all of the primitives defined in the set of indices as complete primitives for use when processing the primitives defined by the input set of indices.

According to these further embodiments the function that is evaluated using the prefix sum is in an embodiment a conditional-right-select function, e.g., and in an embodiment, as described above. In an embodiment the function is an associative function.

However other arrangements would of course be possible and any suitable functions may be used in this respect, as desired.

The result of the above processing is thus to generate a set of values indicating, for each index (position) in the set of indices, the index position of the start of the sequence of indices for the sequence of primitives that the index (position) is part of. From the generated set of such values, it is thus possible to directly calculate the distance from each index (position) to the start of the sequence of primitives that the index position is part of, e.g., and in an embodiment, by simply subtracting the position of the start of the sequence of indices for the sequence of primitives that the index position is part of from the index position of the index. In an embodiment this is done for all of the indices in the set of indices in one step, e.g. by subtracting the set of values indicating the starts of the sequence of indices for the sequence of primitives that the indices (index positions) are part of from the respective index positions for the set of indices.

In this way a corresponding set of distance values can be (and is) generated that represents, for each index (position) in the set of indices, the distance (in terms of number of index positions) from the index position to the position of the start of the sequence of indices for the sequence of primitives that the index (position) is part of The technology described herein then determines for each index (position) in the set of indices based on the distance of the index (position) to the start of the sequence of indices for the sequence of primitives that the index (position) is part of, whether or not the index (position) corresponds to the start of a new primitive.

In the technology described herein the indices (index positions) are therefore, in effect, and in an embodiment, worked through in order, e.g. starting with the first index (position) in the set of indices (or the first index (position) after a primitive restart), in order to determine using the corresponding distance from the index position being considered to the start of the sequence of indices for the sequence of primitives that the index position is part of which index positions (if any) should generate ('spawn') a new primitive.

This is in an embodiment done based on, and in accordance with, a (particular) primitive arrangement type, or types, e.g., and in an embodiment, that has been specified for the set of indices in question.

For instance, the graphics API will typically define a number of different primitive arrangement "types", each involving a different mapping of vertices into a set of primitives, and one of these primitive arrangement "types" will be specified for the and each sequence of primitives that is represented by a sequence of indices in the set of indices that is to be processed (e.g., and in an embodiment, by the application that is requesting the graphics processing and/or the driver for the graphics processor). For example, a primitive arrangement type may be specified for each draw call. The index array in an embodiment defines primitives corresponding to a single draw call, and hence having the same primitive arrangement type. However, it would also be possible for the index array to define primitives corresponding to multiple draw calls, which could have different primitive arrangement types.

Furthermore, the inventors have recognised that for each primitive arrangement type that can be specified, there will be (or there can be defined) a corresponding rule that determines how to construct primitives for that type of arrangement from a given set of indices. The technology described herein recognises that this determination (e.g. rule) can be based, at least in part, on the distance from the index position to the start of the sequence of primitives that the index position is part of, e.g. such that the primitives can be identified from the set of distance values.

Thus, in the technology described herein, there is a set of one or more, and in an embodiment plural, primitive arrangement types that can be specified, and for each available primitive arrangement type there is in an embodiment specified one or more rules that identify whether an index (position) having a certain distance from the start of the sequence of indices for the sequence of primitives that the index (position) is part of represents the start of a primitive of the specified primitive arrangement type. By applying such a rule to the set of distance values it is therefore possible to identify which indices (index positions) correspond to the start of a primitive of the specified primitive arrangement type, e.g. such that these primitives can then be written out accordingly, and in an embodiment this is done.

Thus, in embodiments, the primitives that are indexed by the set of indices have a specified primitive arrangement type, and determining whether or not an index corresponds to the start of a complete primitive comprises applying one or more rule to the respective distance value for the index based on the specified primitive arrangement type.

For example, in the case of individual triangular primitives, each triangle requires three indices in order for its vertices to be defined, which means that each consecutive group of three vertices may represent a complete primitive. In other words, every third index position is capable of generating a new primitive. So, in that case, by applying an appropriate rule that identifies every third index position from the start of a sequence of indices for a sequence of primitives, it is possible to determine the start of each new primitive in the sequence of primitives accordingly.

For instance, as mentioned above, for each index (position), n, a distance to the start of the sequence of indices for the sequence of primitives that the index (position) is part of can be (and in an embodiment is) evaluated using the following expression, where S(n) is the position of the start of the sequence of indices for the sequence of primitives that the index (position) is part of (e.g. such that S(n) is the position of the most recent primitive restart in the sequence, or for cases where the index (position) n occurs before the position of the first primitive restart, a virtual index position before the index position of the first real index in the set of indices):

$$n-S(n)$$

Thus, for triangular primitives, the rule may comprise evaluating, for each index position n, whether the following expression is satisfied:

$$n-S(n) \bmod 3=0$$

where any index positions where this expression is satisfied may represent the start of a new potential triangular primitive, and can be identified accordingly. For instance, in this case, the complete primitive will then comprise the vertex that is represented by the index position in question as well as the two vertices represented by the next two consecutive index positions (so long as there are enough vertices remaining in the sequence to define a complete primitive).

Of course this is merely an example and other similar expressions may be used to determine whether or not an index position can potentially spawn a new primitive. (For example, the expression n−S(n) mod 3=2 could be used to determine the end of a triangular primitive, and the start of the complete triangular primitive could then be identified by counting backwards from the end.)

In the case of a triangle strip, three consecutive indices define the first triangle in the strip, and after that each additional index defines a new triangle, wherein that index plus the preceding two indices define the triangle (with consecutive triangles having opposite windings). In that case, a rule can be applied that flags the first three consecutive indices after a primitive restart as corresponding to one complete primitive, and then each additional index position after that is flagged as corresponding to a new primitive. In other words, for triangle strips, any index position representing a vertex having a distance from the previous primitive restart greater than or equal to three should generate a new primitive (with the winding in an embodiment being reversed from one primitive to the next, and the winding order in an embodiment determined by determining whether the index position is odd or even, e.g. as will be explained further below).

As another example, in the case of a triangle fan, a first index defines a hub index. The next two indices together with the hub index define the first triangle. After that, each new index defines a triangle from the new index, the preceding index and the hub vertex index. Again, this means that any index position representing a vertex having a distance from the previous primitive restart greater than or equal to three should generate a new primitive (although in this case there is no need to determine winding order).

For a point primitive, each index can spawn a new primitive, and in that case every index position can (and should) be flagged as corresponding to the start of a new complete primitive.

Thus, in embodiments, the specified primitive arrangement type is one of: (i) an individual triangular primitive; (ii) a triangle strip; (iii) a triangle fan; or (iv) a point primitive, and a corresponding rule is defined accordingly for processing the set of distance values to determine whether the corresponding indices (index positions) should generate a new primitive.

However, in general, the technology described herein can be applied to any suitable primitive arrangement type, e.g. that may be defined by the graphics API, or otherwise specified, and corresponding rules can be generated accordingly for any other suitable primitive arrangement types.

As well as considering the distance to the start of the sequence of primitives that the index position is part of, one or more other criteria may also or instead used to determine if an index (position) should generate a new primitive or not.

For example, once an index (position) has been identified as corresponding to the start of a primitive, further requirements may also need to be met in order to determine whether the index (position) should be indicated to be written out/stored as a complete primitive or not, e.g., and in an embodiment, depending on the primitive arrangement type being tested for.

For example, for triangular primitives, in order for an index (position) that has been determined to represent the start of a new triangular primitive to be considered as a complete triangular primitive, the next two consecutive indices (index positions) in the set of indices must also represent vertices, in order to define the complete triangular primitive. Otherwise, if there are not enough vertices in the sequence of indices for the sequence of primitives that the index (position) is part of to define a complete primitive of the specified primitive arrangement type, the index (position) may be considered to represent an "incomplete" primitive, in which case the primitive may not be, and in an embodiment is not, written out/stored (e.g. in cases where only complete primitives are desired to be processed).

In general the rule(s) for determining whether an index (position) corresponds to the start of a primitive and/or a part of a complete primitive can be more or less complex as desired, e.g. depending on the primitive arrangement type.

Furthermore, there may be other more complex primitive arrangement types, e.g. which may also be defined by the graphics processor, rather than the API, which require additional processing. An example of this might be a triangle "pair". In a triangle pair it may generally be necessary to ensure that each triangle is only included in a single triangle pair, e.g., and in an embodiment, such that each triangle pair is unique. To do this, the most recent unpaired triangle can be tracked, e.g. by executing another suitable prefix sum. However, other arrangements would also be possible.

It will be appreciated that the steps described above of determining the distance to the start of the sequence of indices for the sequence of primitives that an index (position) is part of (e.g. the distance to the most recent primitive restart) and applying a rule based on the specified primitive arrangement type to determine whether the index (position) corresponds to the start of (or a part of) a primitive do not necessarily need to be, and in embodiments are not, separate, sequential steps. For example, the rule may be, in effect, applied at least in part when generating the set of distance values, e.g. by calculating the distances in such a manner to provide such information (e.g. by performing the subtraction modulo 3 in order to identify every third index position in the set of indices, as described above).

It is also possible to apply further optimisations during such calculations, and in some embodiments this is done. For example, if it is known that for all primitive arrangement types that are available, e.g. for the API in question, the effective loop size (i.e. the number of index positions over which primitives will start to repeat, so, e.g., three for triangular primitives) is a divisor of some number (e.g. 12, which would cover loop sizes of 2, 3, 4, 6), then the distances only ever need to be calculated modulo that number, and in an embodiment this is done. In this way it is possible to reduce the size of the distance values that need to be stored. However, in that case it may be necessary to provide exceptional case handling, e.g. to distinguish the first index (position) in the set of indices from other indices (index positions) representing the start of a new 'loop'. For example, where the distances are calculated modulo 12, it may be necessary to distinguish between the first and thirteenth index positions (since 13 mod 12=1), e.g. to make sure that it is possible to generate a primitive from the thirteenth index position, whereas it may not be possible to generate a primitive from the first index position (since there may not be enough vertices to do so). This can be achieved, e.g., by signalling, e.g. using additional bits, that the first index position is the true first index position.

The result of the above is thus that it is possible to identify which indices (index positions) in a set of indices correspond to the start of a new primitive, and to flag this accordingly.

Thus, a first set of output values may be generated representing for each index (position) in the set of indices whether or not the index (position) can generate a new primitive, e.g., and in an embodiment, for a specified primitive arrangement type. For each index (position) for which it is determined that the index (position) can generate a new primitive, it is in an embodiment then determined whether the index (position) can generate a complete primitive (for the specified primitive arrangement type).

Thus, when an index (position) in a set of indices is identified as being the start of a complete primitive in the set of indices, then in an embodiment, the complete primitive for that index (position) (i.e. including all of its indices from the set of indices) is written out to storage, e.g., and in an embodiment, to a (reordered) set of indices that contains (defines) complete primitives, and in an embodiment has no primitive restarts. A complete primitive is in an embodiment stored (written out) as the sequence of its vertex indices from the input set of indices.

Thus, in embodiments, a second set of output values is then generated representing a modified (or re-ordered) set of indices that contains only complete primitives (e.g., and in an embodiment, with any primitive restarts and incomplete primitives removed).

At the same time, the output positions of the complete primitives is in an embodiment determined, e.g., and in an embodiment, by determining a count of the number of complete primitives in the set of indices.

Thus, in an embodiment, the output position (i.e. the position in the sequence of primitives that the primitive being written out should have) is in an embodiment also or instead (and in an embodiment also) determined (with the identified complete primitive then being written out to that determined output position in the written out sequences of primitive). This then ensures that when a new complete primitive set of indices is written out, the identified complete primitives from the original set of indices will be written to and placed in the correct positions in the modified set of indices that contains only complete primitives.

Determining the output position for an identified complete primitive in an embodiment comprises summing the number of complete primitives found up to the position of the primitive index in question. Adding up the number of primitives found up to the position of a complete primitive to be output, determines the position (number) of the primitive to be output in the sequence of primitives in question.

The number of primitives before the position of a complete primitive to be output can be determined in any suitable and desired manner. However, in an embodiment, the number of primitives is calculated using another prefix sum that adds up the number of primitives found up to the position of the primitive index to be output.

For instance, the result of computing the respective state items, e.g. 'spawn primitive' flags, for each index position, is to generate a further array of such flags that indicates for each index position in the original index array whether or not that index can generate a new primitive. For example, each index position that is able to generate a new primitive may be represented in this array as a '1', with the other index positions represented as a '0'.

Once each index has been tagged with such a "spawn primitive" flag, this array can then be used to generate an array of complete primitives, e.g. for output.

This 'spawn' primitive array will be 'sparse' (with holes (zeros) for every index position that doesn't generate a new primitive). A parallel compaction algorithm is then in an embodiment applied to the primitive array in order to determine the output positions for each of the primitives, e.g. in order to remove the primitive restarts, etc. The parallel compaction algorithm is in an embodiment implemented by applying another parallel prefix sum algorithm. In this case, an output array is constructed, that, for each index position, is initialized with 1 if the corresponding index has been tagged with the "spawn primitive" flag and 0 otherwise—and then a parallel prefix sum using plain integer addition as the function F:

$$F(x,y)=x+y$$

is performed. This will, for each index position tagged with the "spawn primitive" flag, compute its position in an output array. The tagged primitives can then be written to the indicated positions in that output array, and in an embodiment this is done. The top value of this prefix sum will also give the total number of complete primitives to be written out.

Thus, in embodiments, when it is determined that an index corresponds to the start of a complete primitive, the method comprises (the primitive assembly circuit) determining the position of that complete primitive in an output sequence of primitives, wherein determining the position in the output sequence of primitives for an identified complete primitive comprises using a prefix sum to determine the number of complete primitives in the sequence of indices up to that complete primitive. For instance, by performing the prefix sum over the entire set of indices is thus possible to determine a count of the total number of primitives in the set of indices. Or, by modifying the function to re-set the count of primitives at each primitive restart, it would also be possible to determine a count of the number of primitives in each sequence of indices (i.e. since the most recent primitive restart).

Thus, this approach can be used to convert a set of indices comprising primitive restarts into a new, equivalent set of indices which contains only complete primitives, with no primitive restarts, in a more efficient manner. A modified version of the set of indices that contains complete primitives can thus be written out. In an embodiment the modified version of the set of indices comprises all of the primitives defined in the set of indices as complete primitives. However, this need not be the case, and the modified version of the set of indices may in some cases comprise only some (less than all) of the primitives defined in the set of indices as complete primitives.

Thus the technology described herein can provide an efficient method of reordering a set of indices to eliminate any primitive restarts.

The indices needed to construct the complete primitive can then be obtained from a fixed-size neighbourhood around the index (position) representing the start of the primitive. For example, as mentioned above, for a triangular primitive, the first index (position) represents the start of the triangle, and the next two indices (at the next two index positions) can then be obtained in order to complete the triangle.

If there are any unused indices (vertices), that do not form part of a complete primitive, these may need to be explicitly discarded. This discard mechanism may, for example, be implemented by treating each unused vertex as a primitive restart, such that these are removed during the step of converting the sparse array of primitives into the array of complete primitives, e.g. as described above. However, other mechanisms would be possible.

The newly created set of indices representing the complete primitives can then be used to allow graphics processing operations, such as, and in an embodiment, geometry shading, that need complete primitives to operate on, to process the primitives defined by the original set of indices in a more efficient, and in particular, in a parallel, manner, since as the new set of indices contains only complete primitives, that set can, for example, be randomly accessed by a geometry shader for the purposes of geometry shading the primitives. Thus, in embodiments, the modified version of the set of indices that contains complete primitives is provided to, e.g., a suitable primitive processing (e.g. rendering) circuit, and used to process a plurality of primitives in parallel.

For some primitive arrangement types, such as primitive fans, or line loops, it is also necessary to obtain the index at the first index position after the start of the sequence of primitives that the index (position) is part of. This can be (and in an embodiment is) done by performing another prefix sum over the set of indices, e.g. in a similar fashion as described above but that outputs for each index (position) the index position of the first index after the start of the sequence of indices for the sequence of primitives that the index (position) is part of (rather than outputting the position start of the sequence of indices for the sequences of primitives that the index (position) is part of). For instance, in this case, the function F that is evaluated using the prefix sum may be set to a conditional-right-select function, e.g. as above, but with the predicate for each index (position) set to, e.g., "is the previous index position a primitive restart?". This will then generate a set of values that, for each index (position), provides the index position of the first index after the start of the sequence of primitives that the index (position) is part of. This array can then be used to assemble the complete primitives accordingly.

Thus, in embodiments, the method further comprises (the primitive assembly circuit) determining, for each index (position), the index position of the first index in the sequence of indices for the sequence of primitives that the index (position) is part of. In an embodiment this is done by performing a prefix sum over the set of indices (index positions) wherein the prefix sum evaluates, for each index (position) in the set of indices, a function that determines whether or not the previous index (position) in the set of indices corresponds to the start of a new sequence of indices for a sequence of primitives. When it is determined for the index being evaluated that the previous index (position) does correspond to the start of a new sequence of indices for a sequence of primitives (e.g. because it corresponds to a primitive restart), the function outputs the current index position. On the other hand, when it is determined for the index being evaluated that the previous index (position) does not correspond to the start of a new sequence of indices for a sequence of primitives, the function outputs the index position of the first index for the sequence of indices for the sequence of primitives that the current index (position) is part of.

For some other primitive arrangement types, such as primitive strips, the winding order of the primitives is typically also defined to change for each new primitive (e.g. such that if the current primitive count (or position) in the set of indices is odd, then the order of the first two indices in the primitive are swapped, as mentioned above).

Thus, in some embodiments, before a candidate primitive which has been determined to be a complete primitive is written out, the winding order for its vertices is determined (e.g. so that the primitive may be (and is in an embodiment) written out (stored) with its vertices (its vertex indices) in the correct order).

Thus, in an embodiment, once it is determined that an index position is the start of a complete primitive, the winding order for that complete primitive is determined.

The winding order for a primitive can be determined in any suitable and desired manner. In an embodiment, this is done using the determined start position in the set of indices for the sequence of indices for the sequence of primitives that the index (position) (i.e. the complete primitive in question) belongs to. Most in an embodiment, the winding order is determined based on the number of indices (index positions) between the determined start position for the sequence of indices for the sequence of primitives in question before the primitive index position in question and the primitive index position in question. In an embodiment the winding order is determined based on whether this number of index positions is odd or even.

Most in an embodiment, in order to find the winding order for a primitive, the following expression is tested, wherein n−S(n) represents the distance from the index position n to the position of the start of the sequence of primitives S(n) that the index (position) is part of:

$$n-S(n) \bmod 2.$$

The winding order is in an embodiment then set depending on the value of this expression. In an embodiment, if this expression is odd, the winding order is swapped relative to the order that the indices have in the input set of indices.

Thus in embodiments, for cases where the specified primitive arrangement type requires adjacent primitives to have different winding orders, the method comprises determining the winding order for each complete primitive based on the distance between the index position representing the start of the primitive and the start of the sequence of primitives that the index position is part of.

While it would be possible to scan the set of indices in one of the above manners as a whole, in an embodiment, the set of indices is divided into two or more blocks of (consecutive) index positions for scanning. Each such block may contain any desired number of index positions, such as 256 index positions. This can then allow the blocks of index positions to be scanned individually, e.g. in parallel, for example using different processing cores, thereby further improving processing efficiency. In this case, each block may be considered and treated as a single OpenCL work group, for example.

Thus, in an embodiment, an input set of indices to be processed is divided into two or more smaller blocks of consecutive index positions. In an embodiment, each block has a size Nblock (where Nblock is the number of index positions in the blocks). In an embodiment Nblock is the same for all of the blocks, i.e. the blocks are the same size. (If the input set of indices cannot be divided into equal-sized blocks, the input set of indices may be "padded" (enlarged), e.g. with appropriate dummy values, which dummy values may, e.g., correspond to the value that is used to indicate a primitive restart, so that equal-sized blocks may be provided.)

Where an input set of indices to be processed is divided into two or more blocks of index positions for scanning, then the results of scanning a given block may need to be propagated to the later blocks (in the appropriate propagation direction) of the overall set of indices, so that all of the index positions in the set of indices can take account (appropriately) of all of the values determined for the individual blocks, and in an embodiment this is therefore done.

For instance, if index array spans several blocks, there may be vertices at the end of a given block that have not yet been used to form complete primitives (but that may still correspond to a complete primitive) and that therefore need to be carried forward for the processing of the next block, e.g. depending on the primitive arrangement type.

For example, for triangular primitives, if the final one or two indices (index positions) in a given block have not yet been used to form a complete primitive, these may need to be carried over to the next block, as the sequence of indices for the sequence of primitives that these indices (index positions) are part of may continue into the next block. That is, the final one or two indices (index positions) in the first block may define a complete primitive together with the first index (or indices) in the next block. Thus, these indices (index positions) are in an embodiment carried over for processing for the next block. For triangle fans, it is also necessary to carry over the first index after the position of the start of the current primitive sequence, since this is used for all of the primitives in the current sequence of primitives. Other arrangements may be possible, e.g. depending on the primitive arrangement type.

Similarly, it may be necessary, for each block, to take the top output of the prefix sums described above and apply this as the initial value ($v_0$) for the prefix sums for the next block to be processed, and in an embodiment this is done. (As mentioned above, for the first block, the initial value $v_0$ is in an embodiment set as a virtual index position before the position of the first real index in the set of indices, e.g. by setting $v_0$ to '−1', at least where the indices have index positions starting at '0').

For instance, it may be necessary to carry over the index position (in the first block) of the start of the sequence of indices for the current sequence of primitives where the sequence of indices for the sequence of primitives spans across multiple blocks. Thus, in embodiments, the index position of the final (most recent) primitive restart in the current block is carried over for use when processing the next block.

It may also be necessary to carry over the count of the number of complete primitives in the current block so that the count can be continued for the next block, e.g. in order to determine the output positions of the complete primitives.

Thus, for cases where the index array spans several blocks, and is larger than the primitive assembly circuit (or in particular a parallel prefix sum circuit thereof) can handle in a single processing (clock) cycle, the index array may need to be (and can be) processed over multiple processing (clock) cycles, e.g., and in an embodiment, with a fixed number of input indices (i.e. a single block) provided per cycle, and in order to do this it may be necessary to carry over some information from the processing of one block for use when processing the next block.

To do this, an appropriate "residual" value or values is in an embodiment produced for each block, which is in an embodiment the top result of the scans described above (e.g. the position of the start of the last sequence of indices for a sequence of primitives, $S(n)$, for the block and/or the count of the number of complete primitives for the block).

Thus, in embodiments, the overall set of indices (index positions) is divided into a plurality of blocks for processing, with each block being capable of being processed in a single processing cycle, and the method comprises: processing a first block into which the set of indices has been divided to determine, for each index (position) represented in the first block, whether or not the index (position) is a part of a complete primitive; and carrying over one or more residual value(s) from the processing of the first block for use when processing a second block of indices (index positions) from the same overall set of indices.

It is further recognised that at least some of this information may be stored and tracked for other purposes and, in that case, the existing tracking mechanisms can correspondingly be used for the purpose of propagating the residual value(s) between bocks. So it is another benefit of the technology described herein that it in an embodiment does not require significant extra data or state items to be stored in order to track such residual value(s) between different blocks of indices.

The methods and apparatus of the technology described herein can be implemented in any appropriate and desired manner, e.g. in hardware or software (or both), and in (and be included in) any appropriate device or component.

In an embodiment, the processing of the input set of indices to provide the modified output set of indices that contains only complete primitives is performed by the graphics processor, e.g., and in an embodiment, operating as a general purpose GPU (GPGPU) (using GPGPU compute code on the graphics processor). This is in an embodiment done under the control of and triggered by a driver for the graphics processor that is executing, e.g., on a host processor of the overall data processing system that the graphics processor is part of.

The set of indices may be stored in any suitable and desired memory, which memory may be configured in any suitable and desired manner. For example, it may be an on-chip buffer or it may be an external memory. Similarly, it may be dedicated memory for this purpose or it may be part of a memory that is used for other data as well. In an embodiment, this data is stored in main memory of the system that incorporates the graphics processor.

Thus, the apparatus of the technology described herein may comprise one or more or all of: a host processor or set of plural host processors, a CPU of a host processor, a driver for a graphics processor (GPU) that is to perform the graphics processing operation, and a graphics processor (GPU).

As will be appreciated from the above, the technology described herein is accordingly in an embodiment implemented and executed in a graphics processing system that includes a host processor (CPU) and a graphics processor (GPU), with the host processor executing a driver for the graphics processor.

The graphics processor and/or graphics processing system may also comprise, and/or be in communication with, one or more memories and/or memory devices that store the data described herein, and/or the output data generated by the graphics processing unit, and/or store software for performing the processes described herein. The graphics processing unit may also be in communication with the host microprocessor, and/or with a display for displaying images based on the data generated by the graphics processing unit.

The technology described herein can be used in any suitable and desired graphics processing system. In an embodiment, the graphics processing system is a tile-based graphics processing system (GPU).

The graphics processing system is in an embodiment able to be operated both in a conventional graphics context, e.g. to perform conventional graphics rendering processes, and also in a compute context so as to be able to perform GPGPU processing.

The graphics processor may contain any suitable and desired processing stages (elements) that a graphics processor and processing pipeline may contain such as a vertex shader, geometry shader, rasteriser, a renderer (fragment shader), an early depth (or an early depth and stencil) tester, a late depth (or depth and stencil) tester, a blender, a tile buffer or buffers, a write-out unit, etc.

The graphics processing system in an embodiment includes at least local memory, such as ("on chip") buffer or buffers, and/or register(s), that can be used to store the data required.

The technology described herein can be used for all forms of output that a graphics processing system may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described aspects and embodiments of the technology described herein can, and in an embodiment do, include, as appropriate, any one or more or all of the optional features described herein.

The methods in accordance with the technology described herein may be implemented at least partially using software e.g. computer programs. It will thus be seen that according to further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad aspect the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor or set of plural host processors 1 will require graphics processing operations to be performed by an associated graphics pipeline that is implemented by means of a graphics processing unit (GPU) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
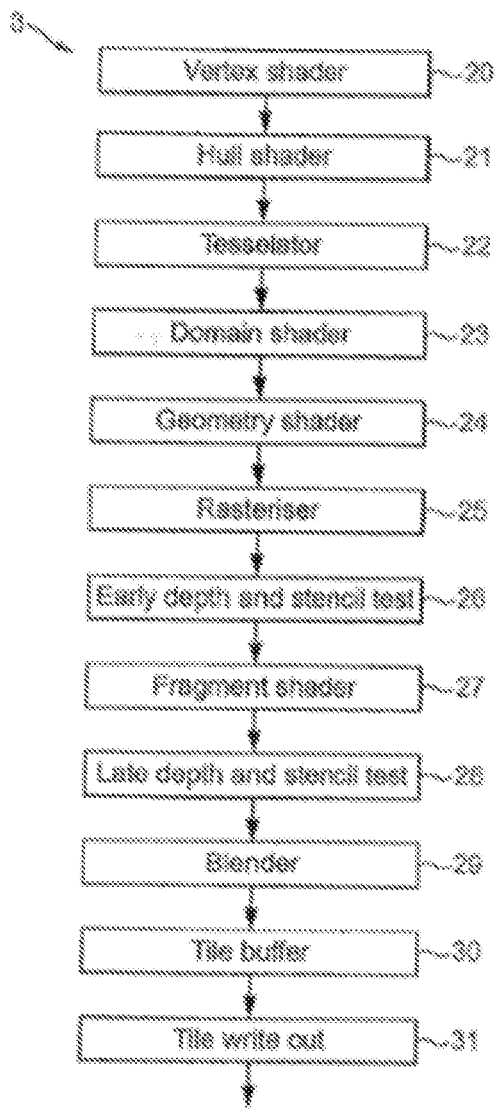
FIG. 2 shows schematically an exemplary graphics processing pipeline.

FIG. 2 shows the graphics processing pipeline 3 in more detail.

The graphics processing pipeline 3 shown in FIG. 2 is a tile-based renderer with a fully programmable GPGPU context, for example a renderer which executes partly via Direct Compute, OpenCL, CUDA, Vulkan, Metal, etc.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., an appropriate circuit and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and write out (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and write out unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible. For example, the rendering need not comprise a rasterisation-based rendering scheme, e.g. as described above, and the rendering that is performed may alternatively comprise ray tracing, hybrid ray tracing, or any other suitable rendering technique, as desired, in which case the graphics processing pipeline may be arranged accordingly.

As discussed above, computer graphics systems typically produce their output, such as frames for display, by processing so-called primitives, which are usually simple polygons such as triangles, or points, lines, etc. In order for the graphics processor to render such primitives it is thus necessary to represent and define these primitives in some way.

To do this, each primitive is normally defined by a set of vertices (e.g. three vertices in the case of a triangular primitive). Typically the set of vertices to be used for a given graphics processing output (e.g. frame for display, draw call, etc.) will be stored as a set of vertex data (a vertex buffer or vertex buffer stream) defining the vertices (e.g. the relevant attributes for each of the vertices).

A corresponding set of indices is also provided indexing the vertices. The set of primitives to be processed for the graphics processing output is thus normally indicated by a sequence of indices (an index buffer stream), that indicates the corresponding vertices in a set of vertex data (in a vertex buffer stream) that are to be used for the primitives in question.

The vertex index array thus contains a sequence of indexes into the vertex array; geometric primitives are then constructed from these indexes. The graphics API may define a set of different "input primitive" arrangement types, where each of these arrangement types define a process for constructing primitives from the indexes. Common examples of such "input primitive" arrangement types include:

Individual triangles: three consecutive indexes define one triangle. The three next indexes define a second triangle, and so on with each triplet of indexes defining a triangle.
Triangle strip: Three consecutive indexes define one the first triangle. After that, each additional index defines a new triangle, where that index plus the preceding two indexes define the triangle. For this to work, it is necessary to toggle the winding for each triangle.
Triangle fan: First, one index is provided, that defines a hub vertex. Then, two additional indexes are provided that together with the first index define a triangle. After that, each new index defines a triangle from the new index, the preceding index and the hub vertex index.

For a given sequence of indices, the primitives that are generated will therefore depend on the specified input primitive arrangement type. For example, for an index array I=(1, 2, 3, 4, 5, 6), the individual triangle mode will result in two triangles: (1, 2, 3) and (4, 5, 6). On the other hand, the triangle strip mode will result in four triangles: (1, 2, 3), (3, 2, 4), (3, 4, 5), (5, 4, 6). Correspondingly, the triangle fan mode will also result in four (different) triangles: (1, 2, 3), (1, 3, 4), (1, 4, 5), (1, 5, 6).

In addition to this, the vertex index array may contain one or more primitive restart item, which is a special index value that indicates that the current input primitive has come to an end and a new input primitive needs to be started. This is particularly useful for triangle strips and triangle fans, but it's generally defined for other primitive arrangement types as well. For example, if the value 99 is used to indicate such a restart value, and the index array (1, 2, 3, 4, 99, 5, 6, 7) is given in the "triangle strip mode", then the resulting triangles will be (1, 2, 3) (3, 2, 4) and (5, 6, 7) where the first two triangles come from a first strip and the third triangle from a second strip.

The present embodiment is concerned with the processing of such index streams, and in particular to the situation where a set of indices defining a set of primitives to be processed may contain one or more "primitive restarts".

Figure 3:
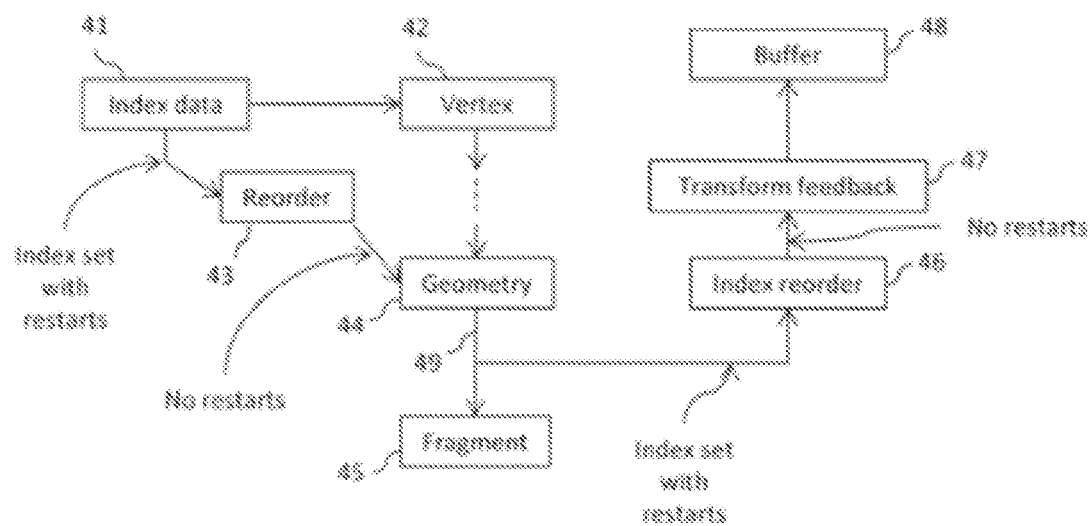
FIG. 3 shows the operation of an embodiment of the technology described herein.

FIG. 3 shows schematically the processing stages in an embodiment of the technology described herein, and where, in this processing, the generation of a reordered set of indices occurs, as will be explained further below.

As shown in FIG. 3, an input set of indices 41, which includes input primitive restarts, and which references (indexes) into a vertex buffer 42, is input to an index reordering stage 43.

The index reordering stage 43 performs an index reordering process that is in accordance with the technology described herein to reorder the indices in the set of indices 41 so as to provide a modified version of the input set of indices that no longer contains any primitive restarts.

The reordered set of indices from the index reordering stage 43 is then input into a geometry shader 44. The geometry shader 44 performs geometry shading operations on complete primitives, using the reordered set of indices output from the index reordering stage 43.

The geometry shader 44 produces as its output a set of indices 49 of primitives to be processed. In the present embodiment, it is assumed that this set of indices 49 output by the geometry shader 44 includes primitive restarts. (Geometry shaders can output multiple, distinct primitives, and/or create, e.g. triangle strips or other primitive sequences that contain primitive restarts, as desired.)

The output set of indices 49 from the geometry shader 44 is passed to a fragment processing stage 45 which performs subsequent processing operations on the primitives that have been processed by the geometry shader 44, such as rasterisation and rendering (fragment shading) operations, to generate the final graphics processing output (e.g. output frame). (The fragment processing stage 45 is able to use the output set of indices 49 from the geometry shader 44 that contains primitive restarts.)

The set of indices 49 with primitive restarts that is output from the geometry shader 44 is, in this embodiment, also input into a second index reordering stage 46, for removal of the primitive restarts. This second index rendering stage 46 again performs an index reordering process that is in accordance with the technology described herein to reorder the indices in the set of indices 49 such that that set of indices no longer contains any primitive restarts.

The data output from the second index reordering stage 46 comprises a set of indices with no primitive restarts and is input into a transform feedback stage 47, which requires a set of indices with no restarts on which to operate. Finally, the data output from the transform feedback stage 47 is written to a buffer 48.

In the present embodiments, as will be explained further below, the first set of indices reordering stage 43 and the second set of indices reordering stage 46 operate to reorder an input set of indices so as to generate a set out of complete primitives for processing.

To do this, the present embodiments first determine, for each index, whether the index corresponds to the start of a complete primitive of the specified primitive arrangement type, and hence whether or not the index in question should spawn a new primitive.

In this respect, the technology described herein recognises that for every primitive arrangement type supported in the APIs in question (OpenGL, DirectX, Vulkan, etc.), it is possible to define one or more rules that determine whether an index should spawn a primitive of the input primitive arrangement type.

For instance, graphics APIs have traditionally described the process of parsing an index array in terms of a state machine, that tracks a state item and a handful of recently-seen indexes, and emits an output primitive when specific states are reached in this state machine. When using such a state machine approach, each index may therefore in effect be processed in series. This can therefore be relatively slow. For example, for individual triangles, the triangle processing rate is restricted to one triangle every three cycles.

The present embodiment therefore takes a different approach. In particular, the technology described herein recognises that the state machine approach to processing will have the state machine enter into a loop after a certain number of indices have been processed, where the length of the loop is determined by the input primitive arrangement type.

For example, for individual triangles, this loop will have length 3, a new triangle should be generated once every three indices. For a triangle strip, the loop will have length 2 corresponding to the fact that the winding must be toggled for each triangle. For a triangle fan, the loop will have length 1.

Based on this, the present embodiment recognises given an index in a vertex index array, its associated 'spawn primitive' state can be determined from how far it is removed from the index position of the most recent primitive restart. For example, for individual triangles, a 'spawn primitive' state can be computed by calculating the distance to the most recent primitive restart modulo 3.

This per-index 'spawn primitive' state can then be used to determine, for each index, whether it should generate a primitive or not.

As part of this, the present embodiment further recognises that the distance to the most recent primitive restart item can advantageously be evaluated using a parallel prefix sum algorithm. In particular, in the present embodiment, the following associative function (as expressed by C-like pseudocode) is used for the primitive assembly:

int F(int y, int x) {
       if(predicate(x)) return x;
       else return y;
    }

This is the 'conditional-right-select' function. What this function does is evaluate the predicate (e.g. "is the index position a primitive restart?") on the current index having index position x in the set of indices and then returns the value of the index position x when the predicate is true, e.g. when the index position x being tested does correspond to a primitive restart. Otherwise, when the predicate is false, e.g. the index position x being tested does not correspond to a primitive restart, the function returns a value y. Thus, by setting the initial value of $v_0$ to the position of the start of the sequence of indices (i.e. the position before the index position of the first index in the set of indices, e.g. by setting the initial value of $v_0$ to '−1' where the indices have index positions numbered from '0'), and then executing this function over the index sequence using a prefix sum, as described above, the function evaluates for each index position in the set of indices $\{x\}$ whether or not the index position corresponds to a primitive restart.

Applying the prefix sum to the input index array I will thus generate a result array R that, for each index, specifies the index position of the most recently-seen Primitive Restart. An array of distance values D can then be constructed by performing a per-item subtraction $D[n]=A[n]-n$, where n comprises the index positions for the set of indices. This array D will, then, for each index in the original index array I, specify the distance to the most-recently-seen primitive restart. From this array of distance values, the "state" item for each index can be calculated and used to determine whether to spawn a primitive from that index or not.

Once each index has been tagged with such a "spawn primitive" flag, this can be used to generate an array of primitives to be processed. This array will be sparse (with holes for every index that doesn't spawn a primitive), and as such in the present embodiment a parallel compaction algorithm is applied, e.g. to remove the primitive restarts.

This requires a second application of a parallel prefix sum algorithm. This time, an array is constructed that, for each index, is initialized with 1 if the corresponding index has been tagged with the "spawn primitive" flag and 0 otherwise. The parallel prefix sum then performs plain integer addition as the function F:

$$F(x,y)=x+y$$

This will, for each tagged item, compute its position in an output array. The tagged items can then be written to the indicated positions in that output array, and we're done.

For the cases where the index array is larger than the parallel prefix sum circuit can handle in a single processing cycle, the index array can be processed over multiple cycles with a fixed number of input indexes provided per cycle. In order to do this, it may be necessary, for each clock cycle, to take the top output of the parallel prefix sums and apply these as the initial-value $v_0$ for the prefix sums in the next clock cycle. (For the first cycle, the initial value is set $v_0=-1$ for both of the prefix sum passes described above, i.e. the virtual index position before the position of the first real index).

This process can further be optimized. For example, for each of the "input primitive" arrangement types supported by OpenGL, DirectX and Vulkan, it has been observed that all of the primitive arrangement types have a state-graph loop that is a divisor of 12 (the actual lengths seen are 1, 2, 3, 4 and 6), and further that they will enter the loop after 8 or less items. As such, instead of computing the full distances to the most recent primitive restart, all of the index positions and distances can be computed modulo 12, and at the same it can be tracked whether or not any of the previous 8 indices were a primitive restart. In this case it would only be necessary to use 5 bits per index, rather than storing the values as full length integers.

For some primitive arrangement types, such as triangle fans and line loops, it is also necessary to obtain the first vertex index after the last primitive restart. This can be obtained by performing an additional parallel prefix sum. This time, the function being evaluated using the prefix sum is set to the conditional-right-select function, but with the predicate for index n set to "is index[n−1] a Primitive Restart?" and the input array to the index array itself. This will generate an array that, for each index, provides the first index after the last Primitive Restart. This then allows these primitives to be assembled. (For other primitive arrangement types, the indexes needed to construct the primitive may be collected, e.g. from a fixed-size neighbourhood around each tagged index.)

The result of all this is a process that can perform primitive assembly for N vertex indexes per clock cycle for all the "input primitive" arrangement types supported by modern graphics APIs, regardless of the actual contents of the vertex indexes.

Figure 4:
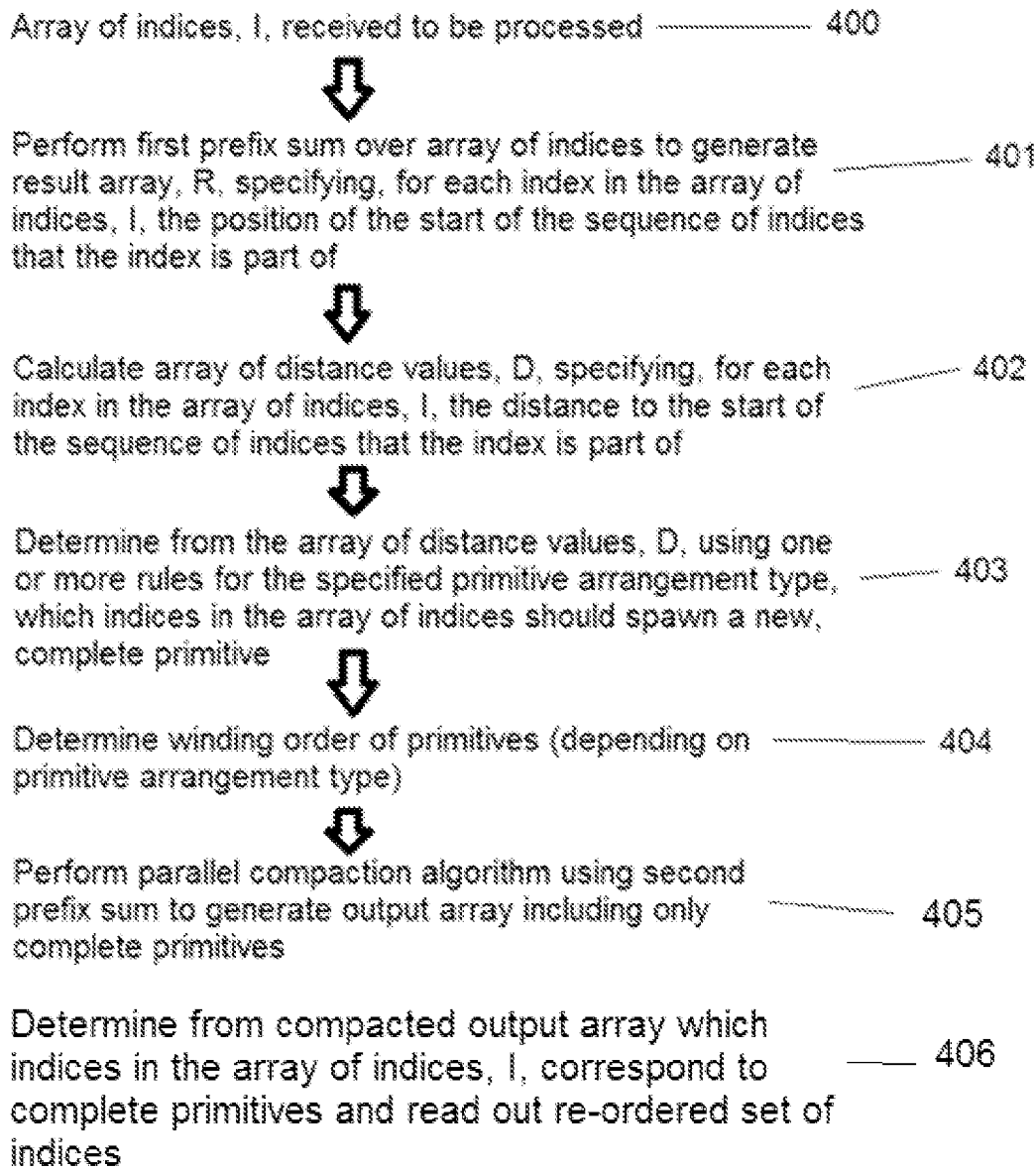
FIG. 4 is a flowchart illustrating a method according to an embodiment of the technology described herein.

A worked example illustrating an embodiment of the index reordering process that is performed at the index reordering stages 43 and 46, will now also be given, with reference to FIG. 4. In this case, it is assumed that the input set of indices defines triangular primitives in the form of triangle strips, and that the first index position in the input set of indices is index position "0".

An example of such an input set of indices, I, with 16 indices, can be given as follows, where X denotes a primitive restart (i.e. the end of a triangle strip):

$$I=(2,5,4,X,6,X,7,9,0,3,X,1,4,11,12,14)$$

As in this case the primitives are provided in the form of triangle strips, the desired set of indices, i.e. with no primitive restarts, would look like this:

$$(2,5,4)(7,9,0)(0,9,3)(1,4,11)(11,4,12)(11,12,14)$$

As can be seen, for the triangles in odd positions in the set after a primitive restart, the winding order for the first two indices defining each primitive is swapped. The presence of a primitive restart, restarts the even/odd counter (i.e. start again from even after a primitive restart).

In order to obtain the desired set of indices from the original set of indices (received at step 400), the first step (step 401) is to determine, for each index in the set of indices I, the index position of the start of the sequence of indices that the index is part of. This is done by performing a first prefix sum over the set of indices that evaluates the 'conditional-right-select' function, to determine for the current index whether or not the index position corresponds to a primitive restart, and then outputs the position of the most-recently-seen primitive restart, in the manner described above.

Thus, the result of evaluating the first prefix sum (step 401) is a result array R that, for each index, specifies the index position of the most recently-seen Primitive Restart. For the first three indices in the set of indices I, at index positions '0', '1' and '2', the start of the sequence of indices is thus the '−1' position. The fourth index (at index position '4') however is a primitive restart that defines the start of a new sequence of indices.

In this example, the result of evaluating the first prefix sum (step 401) is thus a result array:

$$R=(-1,-1,-1,3,3,5,5,5,5,5,10,10,10,10,10,10).$$

A set of distance values D is then obtained (step 402) by performing a per-item subtraction D[n]=R[n]−n, as follows:

$$D=(1,2,3,0,1,0,1,2,3,4,0,1,2,3,4,5).$$

The set of distance values D thus specifies for each index in the original index array, I, the distance to the most-recently-seen primitive restart.

From this set of distance values D it is then possible to determine for each index in the set of indices, whether the index corresponds to the start of a complete primitive in the sequence of indices for the sequence of primitives that the index is part of. This is done by applying a suitable rule (or rules) based on the specified primitive type rule (step 403).

In this example, where the primitives are provided in the form of triangle strips, three consecutive indexes defines a first triangle, and after that each additional index defines a new triangle. A first output array can thus be constructed that indicates each index that should spawn a new, complete primitive as '1'.

Applying this rule to the set of distance values D above thus gives an output array as follows:

$$(1,0,0,0,0,0,1,0,0,1,0,1,0,0,1,1)$$

indicating that the indices at index positions '0', '6', '9', '11', '14' and '15' should all spawn new, complete triangle strip primitives.

From this output array, it is then possible to determine a corresponding set of complete primitives as defined by their respective indices.

For example, in the case of triangle strip primitives, the first triangle primitive in a sequence of indices is defined by the first, three consecutive indices. Thus, in this example, the first complete primitive is spawned by the index at index position '0' and includes the first three indices in the sequence, (2, 5, 4). The next complete primitive is spawned at index position '6' and includes that index and the next two indices in the sequence, (7, 9, 0).

In the case of triangle strip primitives, in order to determine the winding order for the output primitive (step 404), the following expression is also checked:

$$D(n) \bmod 2$$

If this expression is odd, then the winding order is swapped. So, in this example, the winding for the two triangle strips starting at index positions '6' and '9' is alternated. Thus, the next complete primitive after (7, 9, 0) is spawned at index position '9' but includes the previous two indices in the sequence, with the winding being performed in the opposition direction, (0, 9, 3). Similarly, the winding is alternated for the set of triangle strips that start at index positions '11', '14' and '15'.

The output array $$(1,0,0,0,0,0,1,0,0,1,0,1,0,0,1,1)$$

can thus be used to determine a set of complete primitives to be processed. However, this array is sparse (with zeros for every index that doesn't spawn a new primitive). In the present embodiment a parallel compaction algorithm is thus applied to remove any zeros, which may correspond to incomplete primitives or primitive restarts (step 405).

This involves the second application of the parallel prefix sum algorithm, as explained above, that outputs the position of each complete primitive in the output array.

The final step (step 406) is thus to determine from the compacted array which indices in the input set of indices correspond to complete primitives. The input set of indices can then be read out accordingly to emit the reordered set of indices. For example, as mentioned above, in triangle strip mode, for each index position that spawns a new primitive, the index in question as well as the next/previous consecutive two indices (depending on the winding order) will be read out to define a complete primitive. The original set of indices:

I=(2,5,4,X,6,X,7,9,0,3,X,1,4,11,12,14)

can thus be processed and re-ordered as follows:

(2,5,4)(7,9,0)(0,9,3)(1,4,11)(11,4,12)(11,12,14)

which corresponds to the desired set of indices defining a set of complete primitives, i.e. with no primitive restarts.

Various other examples would be possible. For instance, although the present embodiments have been described mainly in relation to triangular primitives, and in particular triangle strips, it will be appreciated that the underlying concepts may be applied to any shape and arrangement of primitives.

Similarly, whilst an embodiment has been described in the context of the index reordering process that is performed at the index reordering stages 43 and 46 shown in FIG. 3, e.g. as part of the vertex and geometry shading stages of the graphics processing pipeline, it will be appreciated that the technology described herein may in general suitably be applied to any other stages and/or graphics processing systems where similar data structures may be found. Likewise, as mentioned above, the technology described herein is not limited to rasterisation-based graphics processing techniques, and the rendering that is performed using the reordered set of indices may comprise ray tracing, hybrid ray tracing, or any other suitable and desired rendering techniques.

It can be seen from the above that the technology described herein, in its embodiments at least, provides a more efficient mechanism for reordering a set of indices that may contain primitive restarts, to provide a reordered set of indices that contains only complete primitives and no primitive restarts. This is achieved, in the embodiments of the technology described herein at least, by identifying the start and end positions of sequences of primitives in an input set of indices and then using those determined primitive sequence start and end positions to determine for index positions in the set of indices whether those index positions correspond to the start of a complete primitive or not. The process is such that it can be implemented in parallel, using efficient scanning operations.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of processing an input set of indices in a graphics processing system, the input set of indices comprising a sequence of indices indexing a set of vertices to identify vertices to be used to form graphics primitives to be processed,
   each index in the input set of indices having a respective index position in the input set of indices,
   the method comprising:

determining, for each index in the input set of indices, the index position of the start of a respective sequence of indices, within the overall sequence of indices comprised in the input set of indices, that the index is part of and that defines a sequence of one or more of the primitives defined by the input set of indices;

determining, for each index in the input set of indices, how far away the index position of the index is from the determined start of the respective sequence of indices defining the sequence of primitives that the index is part of, and thereby generating a corresponding set of distance values representing, for each index in the input set of indices, how far away the index position of the index is from the start of the respective sequence of indices defining the sequence of primitives that the index is part of;

determining, using the set of distance values, for each index in the input set of indices, whether the index corresponds to the start of a complete primitive in the sequence of indices defining the sequence of primitives that the index is part of;

writing out a modified version of the input set of indices that comprises some or all of the primitives defined in the input set of indices as complete primitives; and using the modified version of the input set of indices that contains complete primitives to process the primitives defined by the input set of indices.

2. The method of claim 1, wherein determining, for each index in the input set of indices, the position of the start of the sequence of indices for the sequence of primitives that the index is part of comprises:

performing a prefix sum over the input set of indices, wherein the prefix sum evaluates, for each index in the input set of indices, a function that determines whether or not the index corresponds to the start of a new sequence of indices for a sequence of primitives, and when it is determined that the index being evaluated corresponds to the start of a new sequence of indices for a sequence of primitives, the function outputs the current index position, whereas when it is determined that the current index does not correspond to the start of a new sequence of indices for a sequence of primitives, the function outputs the position of the start of the respective sequence of indices for the sequence of primitives that the index is part of.

3. The method of claim 2, comprising performing the prefix sum over plural indices of the input set of indices in parallel.

4. The method of claim 2, comprising using the modified version of the input set of indices that contains complete primitives to process a plurality of primitives in parallel.

5. The method of claim 1, wherein the primitives defined by the input sequence of vertices have a specified primitive arrangement type, and wherein determining whether or not an index corresponds to the start of a complete primitive comprises applying one or more rule to the respective distance value for the index based on the specified primitive arrangement type.

6. The method of claim 1, comprising: when it is determined that an index corresponds to the start of a complete primitive, determining the position of that complete primitive for an output sequence of primitives, wherein determining the position in the output sequence of primitives for an identified complete primitive comprises using a prefix sum to determine the number of complete primitives in the input set of indices up to that complete primitive.

7. The method of claim 1, wherein the input set of indices is divided into a plurality of blocks for processing, with each block being capable of being processed in a single processing cycle, and the method comprises:

processing a first block into which the input set of indices has been divided to determine, for each index represented in the first block, whether or not the index is a part of a complete primitive; and carrying over one or more residual value(s) from the processing of the first block for use when processing a second block of indices from the input set of indices.

8. A method of processing an input set of indices in a graphics processing system, the input set of indices comprising a sequence of indices indexing a set of vertices to identify vertices to be used to form graphics primitives to be processed, each index in the input set of indices having a respective index position in the input set of indices, the method comprising:

determining, for each index in the input set of indices, the index position of the start of a respective sequence of indices, within the overall sequence of indices comprised in the input set of indices, that the index is part of and that defines a sequence of one or more of the primitives defined by the input set of indices, wherein the determination of the index position of the start of a respective sequence of indices defining a sequence of primitives that the index is part of comprises:

performing a prefix sum over the input set of indices, wherein the prefix sum evaluates a function that determines whether or not the index corresponds to the start of a new sequence of indices defining a sequence of primitives, and when it is determined that the index being evaluated corresponds to the start of a new sequence of indices defining a sequence of primitives, the function outputs the index position of the index, whereas when it is determined that the index being evaluated does not correspond to the start of a new sequence of indices for a sequence of primitives, the function outputs the position of the start of the respective sequence of indices defining the sequence of primitives that the index is part of;

the method further comprising:

determining, for each index in the input set of indices, based on the determined position of the start of the respective sequence of indices for the sequence of primitives that the index is part of, whether the index corresponds to the start of a complete primitive;

writing out a modified version of the input set of indices that comprises some or all of the primitives defined in the input set of indices as complete primitives; and using the modified version of the input set of indices that contains complete primitives to process the primitives defined by the input set of indices.

9. The method of claim 8, comprising performing the prefix sum over plural indices of the input set of indices in parallel.

10. The method of claim 8, comprising using the modified version of the input set of indices that contains complete primitives to process a plurality of primitives in parallel.

11. An apparatus for processing an input set of indices in a graphics processing system, the input set of indices comprising a sequence of indices indexing a set of vertices to identify vertices to be used to form graphics primitives to be processed, each index in the input set of indices having a respective index position in the input set of indices, the apparatus comprising:

a primitive assembly circuit comprising:

a start index position determining circuit configured to determine, for each index in the input set of indices, the index position of the start of a respective sequence of indices, within the overall sequence of indices comprised in the input set of indices, that the index is part of and that defines a sequence of one or more of the primitives defined by the input set of indices a distance values determining circuit configured to determine, for each index in the input set of indices, how far away the index position of the index is from the determined start of the respective sequence of indices defining the sequence of primitives that the index is part of, and thereby generate a corresponding set of distance values representing for each index in the input set of indices how far away the index position of the index is from the start of the respective sequence of indices defining the sequence of primitives that the index is part of; and a primitive determining circuit configured to determine, using the set of distance values, for each index in the input set of indices, whether the index corresponds to the start of a complete primitive in the respective sequence of indices defining the sequence of primitives that the index is part of;

the apparatus further comprising:

a write out control circuit configured to write out a modified version of the input set of indices that comprises some or all of the primitives defined in the input set of indices as complete primitives for use when processing the primitives defined by the input set of indices.

12. The apparatus of claim 11, wherein the start index position determining circuit is configured to perform a prefix sum over the input set of indices, wherein the prefix sum evaluates, for each index in the input set of indices, a function that determines whether or not the index corresponds to the start of a new sequence of indices for a sequence of primitives, and when it is determined that the index being evaluated corresponds to the start of a new sequence of indices for a sequence of primitives, the function outputs the current index position, whereas when it is determined that the current index does not correspond to the start of a new sequence of indices for a sequence of primitives, the function outputs the position of the start of the respective sequence of indices for the sequence of primitives that the index is part of.

13. The apparatus of claim 11, wherein the start index position determining circuit is configured to perform the prefix sum over plural indices of the input set of indices in parallel.

14. The apparatus of claim 11, further comprising a rendering circuit that uses the modified version of the input set of indices that contains complete primitives to process a plurality of primitives in parallel.

15. The apparatus of claim 11, wherein the primitives defined by the input sequence of vertices have a specified primitive arrangement type, and wherein the primitive determining circuit is configured to determine whether or not an index corresponds to the start of a complete primitive by applying one or more rule to the respective distance value for the index based on the specified primitive arrangement type.

16. The apparatus of claim 11, comprising a primitive output circuit that is configured to: when it is determined that an index corresponds to the start of a complete primitive, determining the position of that complete primitive for an output sequence of primitives, wherein determining the position in the output sequence of primitives for an identified complete primitive comprises using a prefix sum to determine the number of complete primitives in the input set of indices up to that complete primitive.

17. The apparatus of claim 11, wherein the input set of indices is divided into a plurality of blocks for processing, with each block being capable of being processed in a single processing cycle, and the primitive assembly circuit is configured to:
  process a first block into which the input set of indices has been divided to determine, for each index represented in the first block, whether or not the index is a part of a complete primitive; and
  carry over one or more residual value(s) from the processing of the first block for use when processing a second block of indices from the input set of indices.

18. An apparatus for processing an input set of indices in a graphics processing system, the input set of indices comprising a sequence of indices indexing a set of vertices to identify vertices to be used to form graphics primitives to be processed,
  each index in the input set of indices having a respective index position in the input set of indices,
  the apparatus comprising:
  a primitive assembly circuit comprising:
  a start index position determining circuit configured to determine, for each index in the input set of indices, the position of the start of a respective sequence of indices, within the overall sequence of indices comprised in the input set of indices, that the index is part of and that defines a sequence of one or more primitives defined by the input set of indices,
  wherein the determination of the index position of the start of a respective sequence of indices defining a sequence of primitives that the index is part of comprises:
  performing a prefix sum over the input set of indices, wherein the prefix sum evaluates a function that determines whether or not the index corresponds to the start of a new sequence of indices defining a sequence of primitives, and
  when it is determined that the index being evaluated corresponds to the start of a new sequence of indices defining a sequence of primitives, the function outputs the index position of the index,
  whereas when it is determined that the index being evaluated does not correspond to the start of a new sequence of indices for a sequence of primitives, the function outputs the position of the start of the respective sequence of indices for the sequence of primitives that the index is part of;
  the primitive assembly circuit further comprising:
  a primitive determining circuit configure to determine, for each index in the input set of indices, based on the determined position of the start of a sequence of indices for a sequence of primitives that the index is part of, whether the index corresponds to the start of a complete primitive;
  the apparatus further comprising:
  a write out control circuit configured to write out a modified version of the input set of indices that comprises some or all of the primitives defined in the input set of indices as complete primitives for use when processing the primitives defined by the input set of indices.

19. The apparatus of claim 18, wherein the start index position determining circuit is configured to perform the prefix sum over plural indices of the input set of indices in parallel.

20. The apparatus of claim 18, further comprising a rendering circuit that uses the modified version of the input set of indices that contains complete primitives to process a plurality of primitives in parallel.

* * * * *